United States Patent [19]

Ampferer

[11] Patent Number: 4,716,638
[45] Date of Patent: Jan. 5, 1988

[54] METHOD FOR ALIGNING BEARING COVERS AT BEARING SECTIONS OF A CRANKCASE

[75] Inventor: Herbert Ampferer, Sachsenheim, Fed. Rep. of Germany

[73] Assignee: Dr. Ing. h.c.F. Porsche Aktiengesellschaft, Weissach, Fed. Rep. of Germany

[21] Appl. No.: 943,059

[22] Filed: Dec. 18, 1986

[30] Foreign Application Priority Data

Dec. 21, 1985 [DE] Fed. Rep. of Germany ....... 3545722

[51] Int. Cl.⁴ .............................................. B23P 15/00
[52] U.S. Cl. .............................. 29/156.4 R; 29/426.1; 29/464; 123/196 CP; 411/424
[58] Field of Search ................ 29/156.4 R, 426.1, 464; 123/196 CP; 411/378, 354, 424, 411

[56]     References Cited
U.S. PATENT DOCUMENTS

| 1,694,535 | 12/1928 | Fejes | 29/156.4 R |
| 2,560,413 | 7/1951 | Carlson | 29/464 |
| 3,921,364 | 11/1975 | Briles | 411/424 X |
| 3,967,367 | 7/1976 | Hayes et al. | 29/464 X |
| 4,050,833 | 9/1977 | Briles | 411/424 X |
| 4,254,542 | 3/1981 | Craig | 29/464 |

FOREIGN PATENT DOCUMENTS

| 0038560 | 4/1981 | European Pat. Off. . |
| 1273269 | 7/1968 | Fed. Rep. of Germany . |
| 2257651 | 11/1982 | Fed. Rep. of Germany . |
| 3545722 | 1/1987 | Fed. Rep. of Germany . |

Primary Examiner—Howard N. Goldberg
Assistant Examiner—Ronald S. Wallace
Attorney, Agent, or Firm—Barnes & Thornburg

[57] ABSTRACT

A method for aligning bearing covers at bearing sections of a crankcase in which bearing covers of a crankshaft bearing are aligned by way of fastening bolts and subsequently machined-in fitting pins and wherein the bearing bore for the crankshaft is subsequently machined. Thereafter, the crankshaft is assembled whereby the bearing cover is at first aligned by the fitting pins and is then fixed by means of the fastening bolts. Not only a secure support of the bearing cover at the bearing sections is assured thereby, but also narrow tolerances which favorably influence the bearing support of the crankshaft, can be maintained without problem.

3 Claims, 1 Drawing Figure

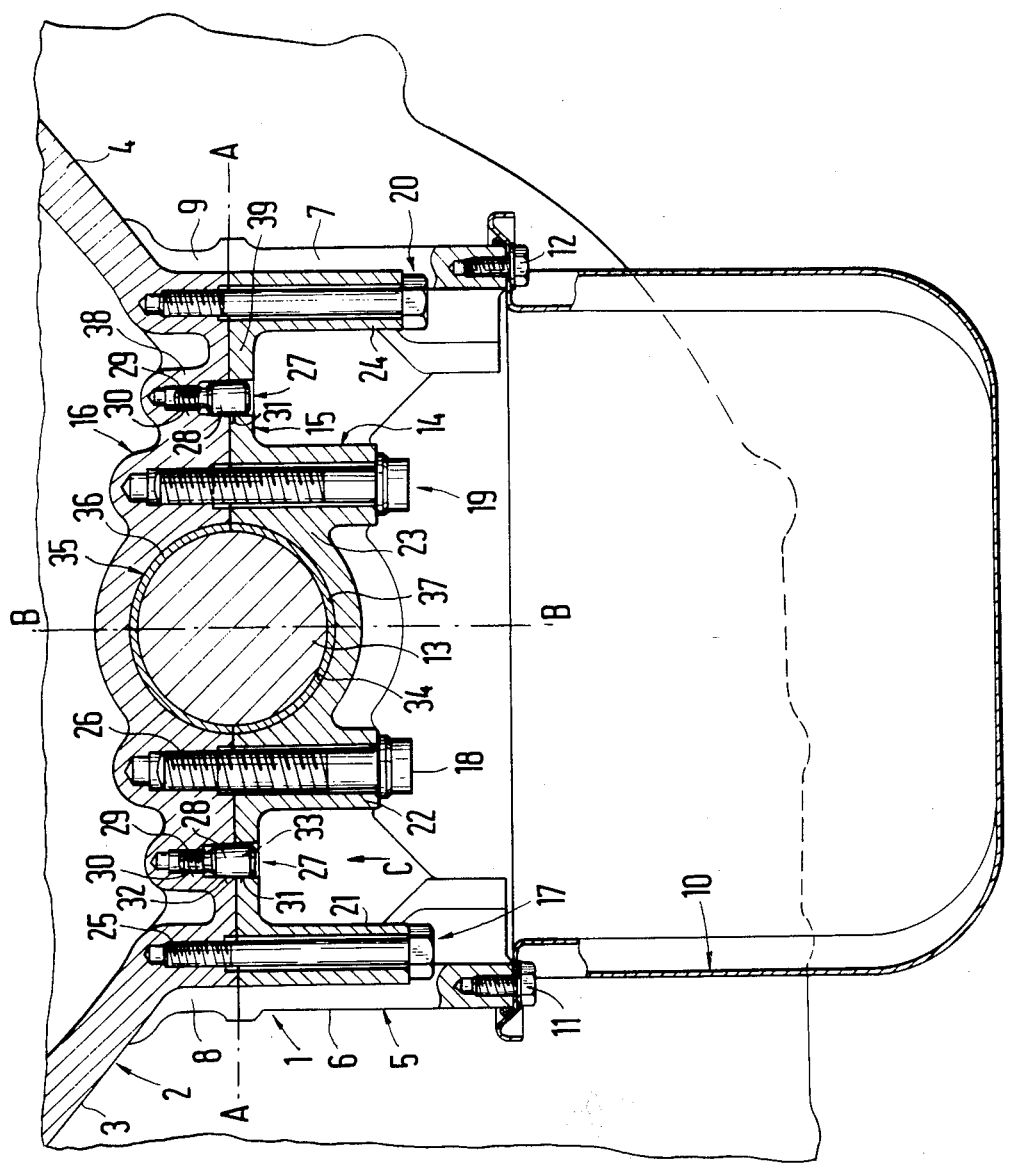

METHOD FOR ALIGNING BEARING COVERS AT BEARING SECTIONS OF A CRANKCASE

The present invention relates to a method for aligning bearing covers at bearing sections of a crankcase and for machining crankshaft bearings formed by the bearing covers and bearing sections whereby the bearing covers cooperate with bearing sections by way of fitting pins and fastening bolts attached on both sides of the crankshaft.

In a known crankshaft bearing (DE-AS No. 1 273 269), the bores for the fitting pins are machined into the bearing covers and into the bearing sections of the crankcase in separate manufacturing cycles. It is thereby disadvantageous that both as regards the diameter of these bores and of the fitting pins as also as regards the axial spacing of these fitting pins, unfavorable tolerance positions may result which can impair not only the assembly of the bearing covers with too narrow a tolerance zone, but also the function of the transverse force support of the mentioned fitting pins with too large a tolerance field.

It is the object of the present invention to provide a method for aligning bearing covers at bearing sections of a crankcase and for machining the crankshaft bearings formed by the bearing covers and the bearing sections, by means of which a narrow tolerance zone of the fitting pin bores among one another and also relative to the bores of the crankshaft bearings is realizable.

The underlying problems are solved according to the present invention in that the bearing cover is secured without crankshaft at the bearing sections by means of fastening bolts, the bores for the fitting pins are then machined into the bearing cover and the bearing sections, the fitting pins are thereafter installed, the bearing bores for the crankshaft formed by the bearing covers and the bearing sections are then machined, the bearing cover is thereupon disassembled, and thereafter the crankshaft and bearing cover are assembled in such a manner that the bearing covers are at first aligned by way of the fitting pins and are then fixed by means of the fastening bolts.

The principal advantages achieved with the present invention reside in that the maintenance of narrower tolerances favorably influencing the bearing support of the crankshaft (noise reduction) between the individual fitting pin bores and also the bores of the crankshaft is possible in a simple manner. Therebeyond, a good transverse force support of the bearing covers at the bearing sections by way of the fitting pins is assured which is of significance in particular for internal combustion engines with cylinder rows arranged V-shaped. The bearing covers may be components of a housing whose outer walls form for purposes of noise reduction a continuation of the crankcase outer walls and overlap crank pins of the crankshaft in the direction of the oil pan. Additionally, the fitting pins which include a conical- and a threaded-bolt portion, assure a rational and positionally correct installation of the bearing covers at the bearing sections of the crankcase.

These and other objects, features and advantages of the present invention will become more apparent from the following description when taken in connection with the accompanying drawing which shows, for purposes of illustration only, one embodiment in accordance with the present invention, and wherein:

The single figure is a partial cross-sectional view through an internal combustion engine in accordance with the present invention with V-shaped arranged cylinders within the area of a crankshaft.

Referring now to the drawing, of the internal combustion engine generally designated by reference numeral 1, a crankcase generally designated by reference numeral 2 is illustrated in the single figure which includes two cylinder rows 3 and 4 arranged V-shaped to one another. The crankcase 2 is connected in a horizontal separating plane A—A to a lower housing generally designated by reference numeral 5 whose lateral boundary walls 6 and 7 are constructed as continuations of the walls 8 and 9 of the crankcase 2. The boundary walls 6 and 7 extend to an oil pan 10 which is retained at the housing 5 by means of bolts 11 and 12. A crankshaft 13 is arranged in a vertical, center longitudinal plane B—B of the internal combustion engine 1 intersecting the separating plane A—A and is received by crankshaft bearings generally designated by reference numeral 14. Each crankshaft bearing 14 is formed by a bearing cover 15 and by a bearing section 16 of the crankcase 2 whereby the bearing cover 15 is connected in one piece with the housing 5—comparable constructions are described in the EP-PS No. 0038560 and in the DE-PS No. 22 57 651. Bearing bolts 17, 18 and 19, 20 serve for the retention of the bearing cover 15 which extend on both sides of the crankshaft 13 or of the center longitudinal plane B—B, and more particularly perpendicularly to the separating plane A—A.

The fastening bolts 17, 18 and 19, 20 extend through bush-like mounting means 21, 22 and 23, 24 of the bearing cover 15 and cooperate with threads 25, 26 in the bearing section 16. A set of fitting pins generally designated by reference numeral 27 is provided between the fastening bolts 17 and 18—also between fastening bolts 19 and 20—which includes a cone portion 28 and a threaded bolt portion 29. The threaded bolt 29 is screwed into a threaded bore 30 of the bearing section 16 whereas the cone 28 cooperates form- and force-lockingly with the conical bores 31 and 32 of the bearing cover 15, respectively, of the bearing section 16. For screwing-in the fitting pin 27, respectively, the threaded bolt 29 into the threaded bore 30, the fitting pin 27 is provided at 33 with a receptacle (internal hexagon) for a tool which is not shown herein.

Bearing shells 36 and 37 are provided between a bearing pin 34 of the crankshaft 13 and a bearing bore 35 of the crankshaft bearing 14.

The method steps for the alignment of the bearing cover 15 at the bearing section 16 and the machining of the bearing bore 35 of the crankshaft bearing 14 are as follows:

(a) Securing the bearing cover 15 without crankshaft 13 by means of fastening bolts 18 and 19, possibly also 17 and 20;

(b) Machining the bores 30, 31 and 32 for the fitting pin 27 into the bearinq oover 15 and the bearing sections 16;

(c) Assembling the fitting pin 27;

(d) Machining of the bearing bore 35 for the crankshaft 13 formed by the bearing cover 15 and the bearing sections 16;

(e) Disassembling the bearing cover 16, i.e., disengagement of the fastening bolts 17, 18 and 19, 20 as well as of the fitting pin 27;

(f) Assembling of the crankshaft 13 and of the bearing cover 15 in such a manner that the bearing cover 15 together with the housing 5 is at first aligned by way of the fitting pins 27 and only thereafter is fixed by means of the fastening bolts 17, 18 and 19, 20.

The threaded bore 30 and the conical bore 32 are formed by boring into local thickened portion 38 of the bearing section 16. By contrast, the bearing bore 31 is a through-bore in a cross wall 39 of the bearing cover 15. The bores 30, 31 and 32 are machined from the side of the bearing cover 15—in the direction C.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method for aligning bearing covers at bearing sections of a crankcase and for machining crankshaft bearings formed by the bearing covers and bearing sections, in which the bearing covers cooperate with the bearing sections by way of fitting pins and fastening bolts attached on both sides of the crankshaft, comprising the steps of
   securing the bearing cover without crankshaft at the bearing sections by means of fastening bolts;
   machining bores for the fitting pins into the bearing covers and into the bearing sections;
   installing the fitting pins;
   machining the bearing bores for the crankshaft which are formed by the bearing covers and the bearing sections;
   disassembling the bearing cover; and
   assembling the crankshaft and the bearing cover in such a manner that the bearing covers are at first aligned by way of the fitting pins and are then secured by means of the fastening bolts.

2. A method according to claim 1, wherein the bores for the fitting pins are machined from the side of the bearing covers.

3. A method according to claim 1, wherein the bores for the fitting pins consist of threaded and conical bores.

* * * * *